US007062655B2

(12) United States Patent
Nelson et al.

(10) Patent No.: US 7,062,655 B2
(45) Date of Patent: Jun. 13, 2006

(54) METHOD, SYSTEM, AND STORAGE MEDIUM FOR DETERMINING TRIVIAL KEYBOARD SEQUENCES OF PROPOSED PASSWORDS

(75) Inventors: Mark A. Nelson, Poughkeepsie, NY (US); John J. Petreshock, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/055,276

(22) Filed: Jan. 23, 2002

(65) Prior Publication Data

US 2003/0140258 A1    Jul. 24, 2003

(51) Int. Cl.
*H04K 1/00* (2006.01)
*H04L 9/00* (2006.01)
(52) U.S. Cl. .................... 713/183; 713/182; 726/1; 726/2; 726/5; 726/6
(58) Field of Classification Search ........ 713/182–184, 713/200, 202
See application file for complete search history.

(56) References Cited

U.S. PATENT DOCUMENTS

| 5,204,966 | A | | 4/1993 | Wittenberg et al. | |
|---|---|---|---|---|---|
| 5,394,471 | A | | 2/1995 | Ganesan et al. | |
| 5,719,941 | A | * | 2/1998 | Swift et al. ................. | 713/155 |
| 5,944,825 | A | | 8/1999 | Bellemore et al. | |
| 6,388,657 | B1 | * | 5/2002 | Natoli ....................... | 345/168 |
| 6,421,453 | B1 | * | 7/2002 | Kanevsky et al. .......... | 382/115 |
| 6,748,544 | B1 | * | 6/2004 | Challener et al. .......... | 713/202 |

OTHER PUBLICATIONS

Leggett et al, "Dynamic Identity Verification via Keystroke Characteristics", Int. J. Man-Machine Studies, 1991, pp. 859-870.*
IBM Technical Disclosure Bulletin, vol. 35, No. 2, Jul. 1992 "Passphrase Filter For Detection/Rejection of Weak User-selected Passphrases", pp. 95-100.

* cited by examiner

*Primary Examiner*—Hosuk Song
*Assistant Examiner*—Ponnoreay Pich
(74) *Attorney, Agent, or Firm*—William A. Kinnaman, Jr.; Cantor Colburn LLP

(57) ABSTRACT

An exemplary embodiment of the invention relates to a method, system, and storage medium for determining trivial keyboard sequences of proposed passwords. The system comprises a user system with associated keyboard input device; a server in communication with the user system via a communications link; a data storage device coupled to the server, the data storage device housing a database including a keyboard profile for specifying a physical layout of character and function keys on the computer keyboard input device; a master password database including a user account associated with the user system; and a password verification mechanism executable by the server. Upon execution, the password verification tool performs an algorithm on the proposed password and determines triviality according to criteria specified in the algorithm. The physical layout of character and function keys is specified by a graphical representation of the computer keyboard input device; an X axis horizontally spanning the graphical representation; and a Y axis vertically spanning the graphical representation. Each of the character and function keys is assigned a unique data coordinate set identifying positional placement values. The network system also includes an identifier assigned to the keyboard profile indicating manufacturer and model data. A keyboard profile, a method and storage medium for determining triviality of proposed passwords are also included.

16 Claims, 3 Drawing Sheets

| X,Y | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 6 | Esc | NA | NA | NA | NA | NA | NA | NA | NA | Prt | Nlk | Pau | NA | Ins | Hm |
| 5 | F1 | F2 | F3 | F4 | F5 | F6 | F7 | F8 | F9 | F10 | F11 | F12 | NA | Del | End |
| 4 | ` | 1 | 2 | 3 | 4 | 5 | 6 | 7 | 8 | 9 | 0 | - | = | Bs | |
| 3 | Tab | Tab | Q | W | E | R | T | Y | U | I | O | P | { | } | |
| 2 | Cl | Cl | A | S | D | F | G | H | J | K | L | ; | " | Ent | Ent |
| 1 | Sh | Sh | Z | X | C | V | B | N | M | < | > | ? | Sh | Sh | Sh |
| 0 | Fn | Ctrl | Ctrl | Alt | Alt | Spa | Spa | Spa | Spa | Spa | Alt | Alt | Ctrl | Ctrl | NA |

FIG 2

METHOD, SYSTEM, AND STORAGE MEDIUM FOR DETERMINING TRIVIAL KEYBOARD SEQUENCES OF PROPOSED PASSWORDS

BACKGROUND

This invention relates generally to password security systems, and more particularly, the present invention relates to a method, system and storage medium for determining trivial keyboard sequences of proposed passwords.

Secure computer network systems rely on security mechanisms to protect the integrity of the applications and information stored therein. Password-based mechanisms are the most common of these security systems and involve the selection of a string of alphanumeric characters that can be assigned either by a system administrator or self-assigned by a system user. The effectiveness of these security mechanisms depend, in part, upon the ability of system users to maintain discreet password usage over time and throughout the duration of network access. One difficulty, however, lies in the struggle to create a balance between the need for providing easily-remembered passwords against the security risks in doing so. Common words and phrases are vulnerable to external and internal attack. Various software programs exist that attempt to gain access to computer systems via systematic login attempts using common words and phrases (also referred to as weak passwords) until a match is found. Selecting non-obvious passwords may not necessarily solve the security problem because they are subject to compromise when password owners who have trouble remembering them resort to keeping written notes with the password. The chances of the written password getting into the wrong hands becomes a risk to the security of the network system.

Virtually every operating system environment provides some controls which attempt to ensure the quality of passwords. Types of controls include: requiring periodic changes of passwords, preventing password re-use, defining minimum length standards for passwords, adopting semantic content restrictions (e.g., passwords may not contain any three-character abbreviation for the months of the year, or a new password may not contain any three sequential characters that are the same as in the existing password), as well as trivial keyboard sequences (e.g., "qwerty").

Various solutions have been devised to reduce or eliminate the problem of weak passwords (e.g., those utilizing common words or trivial keyboard sequences). Known solutions directed to weak passwords relate to password evaluation systems that evaluate the proposed password or substrings of the password against a 'dictionary' or database of known 'bad' password sets, either via a statistical method or a hashing table. These solutions are somewhat limited in that their success depends heavily on the quality and comprehensiveness of the 'bad' password sets. They are also time consuming since proposed passwords and/or its substrings must be each compared against voluminous database entries. Also, there is no guarantee a match will be found for certain common words. Trivial keyboard passwords may be particularly immune from implementation of these solutions because they do not conform to general 'dictionary'-based requirements but instead use computer keyboard sequences. Determining keyboard triviality in prior art systems generally involves checking the password against known character strings, that are stored in a data file. This is a time-consuming process as large database searches are required and all variations of keyboard sequences would be necessary to ensure success.

What is needed is quicker and more direct way to determine trivial keyboard sequences of proposed passwords.

BRIEF SUMMARY

An exemplary embodiment of the invention relates to a method, system, and storage medium for determining trivial keyboard sequences of a proposed password. The system comprises a user system and associated keyboard input device; a server in communication with the user system via a communications link; a data storage device coupled to the server, housing a database including a keyboard profile for specifying a physical layout of character and function keys on the computer keyboard input device; a master password database including a user account; and a password verification mechanism executable by the server. Upon execution, the password verification mechanism performs an algorithm on the proposed password and determines triviality according to criteria specified in the algorithm. The physical layout of character and function keys is specified by a graphical representation of the computer keyboard input device; an X axis horizontally spanning the graphical representation; and a Y axis vertically spanning the graphical representation. Each of the character and function keys is assigned a unique data coordinate set identifying positional placement values. The network system also includes an identifier assigned to the keyboard profile indicating manufacturer and model data. A keyboard profile, a method, and storage medium for determining triviality of a proposed password are also included.

BRIEF DESCRIPTION OF THE DRAWINGS

Referring now to the drawings wherein like elements are numbered alike in the several FIGURES:

FIG. 2 is a sample keyboard profile with assigned 'X' and 'Y' axes and corresponding data points for indicating keys located on a keyboard.

DETAILED DESCRIPTION OF THE PREFERRED EMBODIMENT

The password verification invention addresses the issue of determining trivial keyboard sequences used for proposed password requests. A computer keyboard is represented as a two-dimensional graph, where the X-axis represents the placement of keys in a column of a keyboard, and the Y-axis represents the placement of keys in a row of the keyboard. The password verification mechanism performs a mathematical algorithm on the proposed password according to its assigned data points in order to determine triviality. A standard parameter is set which is used to compare the values derived from the execution of the mathematical algorithm in order to assess acceptable distances between proposed password characters as displayed on the keyboard. If the values are acceptable, the process is finished and the password is approved.

Figure 1:
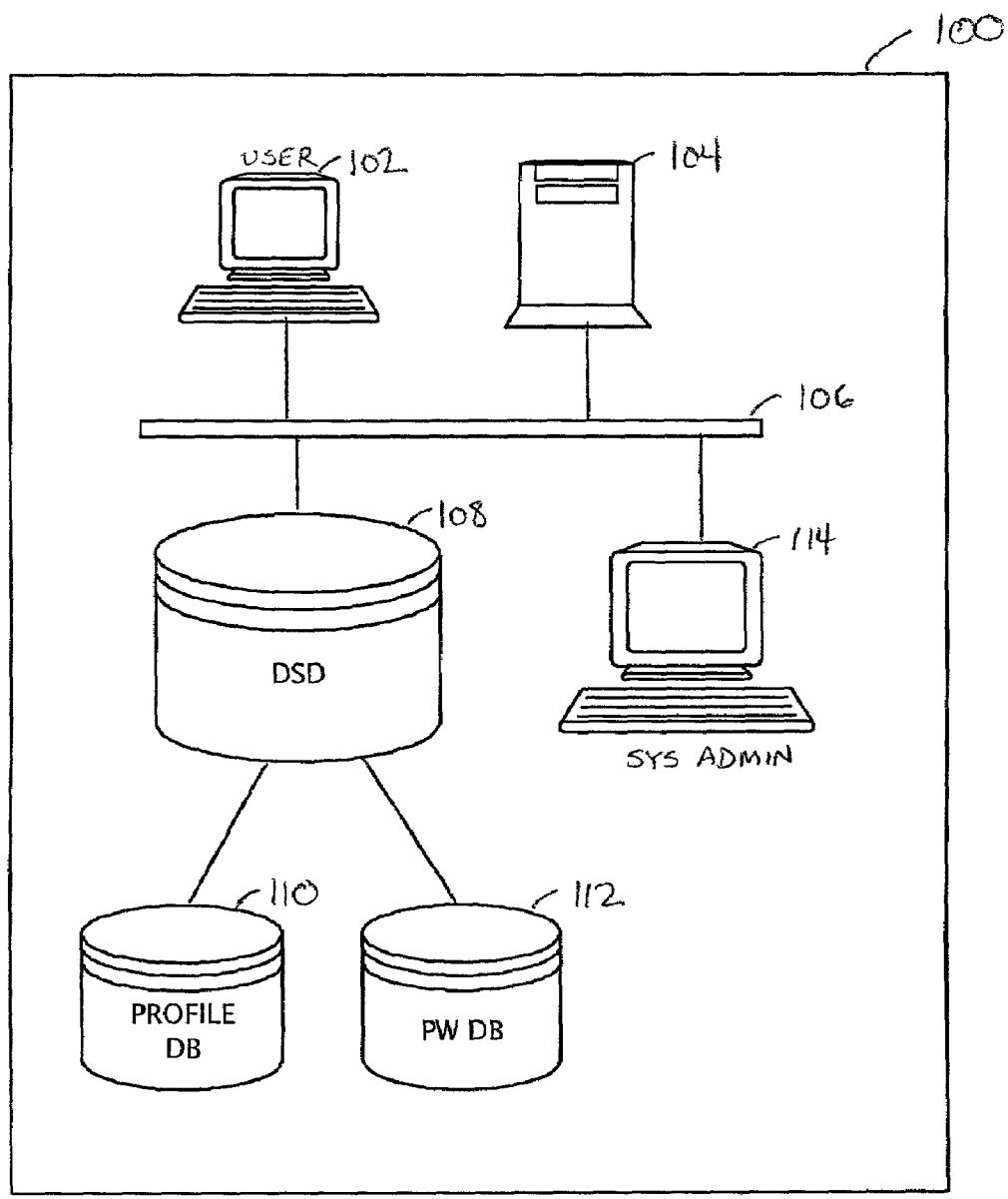
FIG. 1 depicts a computer network system upon which the password verification mechanism is implemented in an exemplary embodiment.

In an exemplary embodiment, the password verification mechanism is implemented on a computer network system such as that depicted in FIG. 1. Network system 100 includes a user system 102 coupled to a server 104 via a communications link 106. System 100 may be a central facility for a business enterprise which executes the password verification mechanism (e.g., regional/global hub facility) or may itself comprise the entire business enterprise. Additional facilities or hubs may be included in system 100 in order to realize the advantages of the invention. Such might be the case where the business enterprise implementing the password verification mechanism is a large global enterprise with offices, sites, and/or distribution centers dispersed around the world. User system 102 and administrator system 114 may be general-purpose computers such as a personal computer (PC), laptop, or handheld appliance that include a processor, memory, computer keyboard input devices, and suitable output devices. User system 102 and administrator system 114 execute one or more computer programs for carrying out the processes described herein. It should be noted that any number of user systems and administrator systems may be utilized by network system 100. Alternatively, user system 102 and/or administrator system 114 may employ applications stored on server 104 wherein user system 102 and administrator system 114 operate as 'dumb' clients and server 104 carries out the processes described herein with respect to the password verification mechanism. Typical users of user system 102 may include management, support staff, and other representatives of the business enterprise. Typical users of administrator system 114 may include security personnel, information technology (IT) specialists, systems maintenance personnel, etc. Communications link 106 may comprise a local area network (LAN), a wide area network (WAN), or other network configuration known in the art. Further, link 106 may include wireless connections, radio-based communications, telephony-based communications, and other network-based communications. For purposes of illustration, however, communications link 106 is a LAN.

Server 104 may be executing suitable web server software designed to accommodate various forms of network communications, including voice, video, and text. Server 104 may also be running e-mail and groupware applications typically found in a business environment. Server 104 executes database management software and security software for assisting users of the password verification mechanism in establishing and maintaining password accounts. Security features may be achieved via a firewall or similar security device for limiting access to network system 100 to those users possessing proper access permissions. For instance, an administrator at system 114 may have access to the entire system and have authority to modify portions of the system. By contrast, a low level employee on user system 102 may have the ability to execute programs but not alter the applications or data stored in data storage device 108. It is understood that more than one server may be used Server 104 may be coupled to a data storage device 108 via communications link 106. Data storage device 108 is any form of mass storage device configured to read and write database type data maintained in a file store (e.g., a magnetic disk data storage device). Data storage device 108 may be logically addressable as a consolidated data source across a distributed environment such as a network system. The implementation of local and wide-area database management systems to achieve the functionality of data storage device 108 will be readily understood by those skilled in the art. Information stored in data storage device 108 may be retrieved and manipulated by database management software executed by server 104. Data storage device 108 contains a variety of information and databases related to the password verification mechanism as well as proprietary information desired by network system 100. Keyboard profiles database 110 houses keyboard profiles related to user systems utilized by the business enterprise. Keyboard profiles define the layout of character and function keys of a computer keyboard for purposes of assigning data coordinates. Keyboard profiles for a variety of computer models are stored in database 110. An example of a keyboard profile is illustrated in FIG. 2.

Master password database 112 stores current validation information for user accounts and may also store keyboard-identifying information related to the system devices assigned to password users. For example, user system's 102 password account may be tagged with keyboard identifying information relating to the keyboard profile that coincides with the user's computer. Other databases may be included in network system 100 as desired by the business enterprise. Data stored in data storage device 108 is accessed by server 104 during presentation of the password verification program to user system 102 and/or administrator system 114. It will be understood that data storage device 108 and server 104 may comprise one server/storage unit and that multiple server/storage units may be employed by network system 100 in order to realize the advantages of the invention.

FIG. 2 illustrates a sample keyboard profile for an IBM ThinkPad 570(TM). A graphical representation of a computer keyboard is displayed indicating actual physical location of character and functions keys as they appear on an actual keyboard. An X-axis spans the keyboard profile horizontally and includes assigned data points X1–X15. A Y-axis spans the keyboard profile vertically and includes assigned data points Y0–Y6. Thus, the coordinates of a password associated with a keyboard profile includes the following data.

| PASSWORD | DATA COORDINATES |
|---|---|
| First letter | (X1, Y1) |
| Second letter | (X2, Y2) |
| Third letter | (X3, Y3) |
| . | |
| . | |
| nth letter | (Xn, Yn) |

The data coordinates for letter 'J' of the keyboard profile of FIG. 2 would be (9, 2). The utility of these assigned data points will be described further herein.

Figure 3:
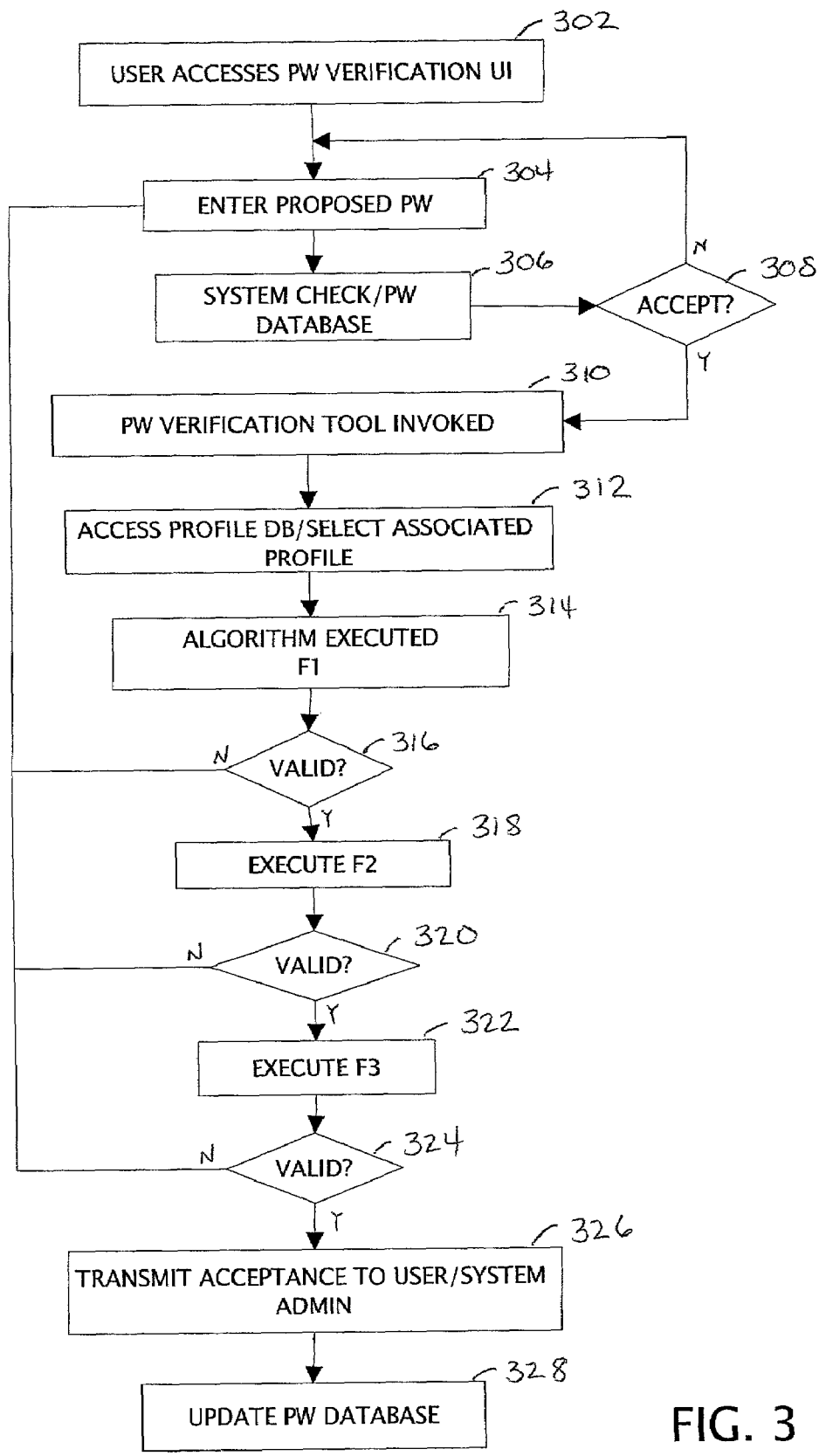
FIG. 3 is a flowchart describing the process of determining trivial keyboard sequences utilizing the password verification mechanism in an exemplary embodiment.

FIG. 3 illustrates a flowchart describing the process of determining trivial keyboard sequences of proposed passwords using the password verification mechanism. A user at user system 102 accesses the password verification mechanism at step 302. The user enters a proposed password request at step 304. The password verification mechanism accesses master password database 112 and checks the proposed password against existing password quality rules, such as minimum length, semantic content, and reuse in database 112 at step 306. If the mechanism finds an inappropriate password (step 308) it redirects the user to select a different password (step 304). If the password has passed the first acceptability test, flow proceeds to step 310 whereby the password verification mechanism is invoked. The password verification mechanism accesses keyboard profile database 110 and retrieves the keyboard profile associated with the user system requesting the password at step 312. This may be accomplished using various techniques. The mechanism may receive an automatic signal from the requesting user system indicating the name, brand, model, etc. of the keyboard/user system in use. Of course, this step may not be required where only one keyboard type is utilized by computer network system 100. The mechanism may also be configured to provide the user with a listing of keyboard/system types available whereby the user selects the appropriate item on the list.

The password verification mechanism executes an algorithm on the proposed password utilizing one or more of three formulas designed to minimize the occurrence and assignment of trivial keyboard passwords. The first two formulas verify that the key strokes associated with the proposed password are not on the same row and column, and the third formula assures a diverse key stroke pattern. If the first formula results in a failure, it is not necessary to proceed with the execution of the second formula and the process ends. Likewise, if the second formula results in a failure, it is not necessary to proceed with the execution of the third formula.

It will be noted that proposed passwords that contain mixed case values may be folded to a single case before the validation mechanism is invoked.

For purposes of illustration, a first proposed password provided by user system 102 is 'qwerty'. Utilizing the keyboard profile of FIG. 2, this password selection would result in data points (3,3), (4,3), (5,3), (6,3), (7,3), and (8,3).

A first formula (F1) is executed at step 314, checking for vertical keyboard sequences (also referred to as 'vertical triviality').

$$F1: (\Delta X1 + \Delta X2 + \ldots + \Delta Xn-1)/(n-1) > 0$$

The following conditions apply to all formulas where 'n' is the length of the password.
$\Delta X1$ equals the difference between X1 and X2.
$\Delta X2$ equals the difference between X2 and X3.
. . .
$\Delta Xn$ equals the difference between Xn+1 and Xn.

In general, let $1 <= m < n$ whereby $\Delta Xm$ is the absolute value of the difference between the X coordinate of letter m and letter m+1 (e.g., $\Delta Xm = \Delta Xm - \Delta Xm+1$) and $\Delta Ym$ is the absolute value of the difference between the Y coordinate of letter m and letter m+1 (e.g., $\Delta Ym = \Delta Ym - \Delta Ym+1$)

S is a system installation parameter and represents the mean distance between character keys used for comparisons. For purposes of illustration, S has been set at '2'.

For the 'qwerty' password example, the first formula applied to it data coordinates results as follows.

$$F1: (1+1+1+1+1)/5 = 1$$

The indicated result of '1' is a valid sequence (step 316) and so the process continues at step 318 where a second formula of the algorithm is executed. Formula 2 verifies horizontal keyboard sequences (also referred to as 'horizontal triviality').

$$F2: (\Delta Y1 + \Delta Y2 + \ldots + \Delta Yn-1)/(n-1) > 0$$

With values of proposed password qwerty plugged in to F2, the following results are indicated.
F2: $(0+0+0+0+0)/5=0$ The indicated result of '0' is an invalid sequence (step 320) and causes a failure and so the process returns to step 304 whereby the mechanism directs the user to provide an alternative password.

Because the second formula failed, the mechanism will not need to initiate formula three. For purposes of illustration, a second password 'Ap_5ple' is provided that will facilitate the description of the execution of the third formula.

Assuming for purposes of illustration that execution of F1 and F2 resulted in a valid sequence, a third formula (F3) is initiated at step 322 as follows.

$$F3: (\Delta X1 + \Delta Y1 + \Delta X2 + \Delta Y2 + \ldots + \Delta X_{(n-1)} \Delta Y_{(n-1)})/(2*(n-1)) >= S$$

or $(F1+F2)/2 >= S$.

Therefore, in the example of the second password 'Ap$_{133}$5ple', F3: $(28/6+5/6)/2 = 2.75$ or $$F3: (1+9+1+0+0+6+1+6+1+1+1+6)/2*6 = 33/12 = 2.75$$

Since the system installation parameter is set at 2, this sequence would pass. The installation parameter number reflects the average distance between key strokes.

Once all three formulas have been validated (step 324), the mechanism transmits an acceptance of the proposed password to the user system 102 and/or administrator system 114 at step 326. The mechanism then updates password database 112 to reflect the new password at step 328.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A network system for determining trivial keyboard sequences of a proposed password, comprising:
   a user system;
   a computer keyboard input device associated with said user system;
   a server in communication with said user system via a communications link;
   a data storage device coupled to said server, said data storage device housing:
      a database including a keyboard profile wherein said keyboard profile specifies a physical layout of character and function keys on said computer keyboard input device;
      a master password database including a user account associated with said user system; and
      a password verification mechanism executable by said server;

wherein, upon execution, said password verification mechanism performs an algorithm on said proposed password, said algorithm including a first formula, comprising:

$$(\Delta X1+\Delta X2+ \ldots +\Delta X_{(n-1)})/(n-1)>0;$$

wherein:
   X represents data coordinate of each character of said proposed password on an X axis of the keyboard profile;
   n represents the number of characters comprising said proposed password: and
   $\Delta X1$ represents an absolute value of a difference between a first and second data coordinate on said X axis:
and wherein further data coordinates are plugged into said first formula for determining vertical triviality.

2. The network system of claim 1, wherein said algorithm includes a second formula executable upon successful completion of said first formula, comprising:

$$(\Delta Y1+\Delta Y2+ \ldots \Delta Y_{(n-1)}/(n-1)>0;$$

wherein:
   Y represents data coordinate of each character of said proposed password on a Y axis of the keyboard profile:
   n represents the number of characters comprising said proposed password; and
   $\Delta Y1$ represents an absolute value of a difference between a first and second data coordinate on said Y axis:
and wherein further data coordinates are plugged into said second formula for determining horizontal triviality.

3. The network system of claim 2, wherein said algorithm includes a third formula, comprising:

$$(\Delta X1+\Delta Y1+\Delta X2+\Delta Y2+ \ldots +\Delta X_{(n-1)}+\Delta Y_{(n-1)})/(2(n-1))>=S;$$

wherein:
   X represents data coordinate of each character of said proposed password on an X axis of the keyboard profile;
   Y represents data coordinate of each character of said proposed password on a Y axis of the keyboard profile;
   n represents the number of characters comprising said proposed password;
   $\Delta X1$ represents an absolute value of a difference between a first and second data coordinate on said X axis;
   $\Delta Y1$ represents an absolute value of a difference between a first and second data coordinate on said Y axis; and
   S represents a variable parameter representing a mean distance between character keys of proposed passwords;
and wherein further data coordinates are plugged into said third formula for determining diverse keystroke patterns of said proposed password.

4. The network system of claim 3, wherein successful completion of said algorithm causes the password verification mechanism to:
   transmit acceptance of said proposed password to at least one of:
      said user system:
      an administrator system; and
   update the password database to reflect said acceptance.

5. A method for determining keyboard triviality of proposed passwords over a network system, comprising:
   receiving a request for a proposed password from a user system;
   retrieving user account data related to said user system;
   checking said proposed password against existing password quality rules stored in a master password database, wherein a requester of said proposed password is redirected to select an alternative password if said checking results in an unacceptable password;
   providing a keyboard profile associated with said user system, said keyboard profile including a unique identifier;
   performing an algorithm on said proposed password, said algorithm including a first formula, comprising:

$$(\Delta X1+\Delta X2+ \ldots +\Delta X_{(n-1)})/(n-1)>0;$$

wherein:
   X represents data coordinate of each character of said proposed password on an X axis of the keyboard profile;
   n represents the number of characters comprising said proposed password; and
   $\Delta X1$ represents an absolute value of a difference between a first and second data coordinate on said X axis;
and wherein further data coordinates are plugged into said first formula for determining vertical triviality.

6. The method of claim 5, wherein said algorithm includes a second formula executable upon successful completion of said first formula, comprising:

$$(\Delta Y1+\Delta Y2+ \ldots \Delta Y_{(n-1)})/(n-1)>0;$$

wherein:
   Y represents data coordinate of each character of said proposed password on a Y axis of the keyboard profile;
   n represents the number of characters comprising said proposed password; and
   $\Delta Y1$ represents an absolute value of a difference between a first and second data coordinate on said Y axis;
and wherein further data coordinates are plugged into said second formula for determining horizontal triviality.

7. The method of claim 5, wherein said algorithm includes a third formula, comprising:

$$(\Delta X1+\Delta Y1+\Delta X2+\Delta Y2+ \ldots +\Delta X_{(n-1)}+\Delta Y_{(n-1)})/(2(n-1))>=S;$$

wherein:
   X represents data coordinate of each character of said proposed password on an X axis of the keyboard profile;
   Y represents data coordinate of each character of said proposed password on a Y axis of the keyboard profile;
   n represents the number of characters comprising said proposed password;
   $\Delta X1$ represents an absolute value of a difference between a first and second data coordinate on said X axis;
   $\Delta Y1$ represents an absolute value of a difference between a first and second data coordinate on said Y axis; and
   S represents a variable parameter representing a mean distance between character keys of proposed passwords;
and wherein further data coordinates are plugged into said third formula for determining diverse keystroke patterns of said proposed password.

8. The method of claim 7, wherein successful completion of said algorithm causes a password verification mechanism to:
  transmit acceptance of said proposed password to at least one of:
    said user system;
    an administrator system; and
  update a password database to reflect said acceptance.

9. The method of claim 5, wherein said identifier is linked to said user account, and wherein further, said keyboard profile is automatically provided over said network system via said link.

10. The method of claim 5, wherein a list of available keyboard profiles are presented to said user selection, and wherein further, said user system selects an appropriate profile.

11. A storage medium encoded with machine-readable computer program code for determining keyboard triviality of proposed passwords over a network system, the storage medium including instructions for causing said computer network to implement a method comprising:
  receiving a request for a proposed password from a user system;
  retrieving user account data related to said user system;
  checking said proposed password against existing password quality rules stored in a master password database, wherein a requester of said proposed password is redirected to select an alternative password if said checking results in an unacceptable password;
  providing a keyboard profile associated with said user system, said keyboard profile including a unique identifier;
  performing an algorithm on said proposed password, said algorithm including a first formula, comprising:

$$(\Delta X1 + \Delta X2 + \ldots + \Delta X_{(n-1)})/(n-1) > 0;$$

wherein:
  X represents data coordinate of each character of said proposed password on an X axis of the keyboard profile;
  n represents the number of characters comprising said proposed password; and
  $\Delta X1$ represents an absolute value of a difference between a first and second data coordinate on said X axis;
  and wherein further data coordinates are plugged into said first formula for determining vertical triviality.

12. The storage medium of claim 11, wherein said algorithm includes a second formula executable upon successful completion of said first formula, comprising:

$$(\Delta Y1 + \Delta Y2 + \ldots \Delta Y_{(n-1)})/(n-1) > 0;$$

wherein:
  Y represents data coordinate of each character of said proposed password on said Y axis;
  n represents the number of characters comprising said proposed password; and
  $\Delta Y1$ represents an absolute value of a difference between a first and second data coordinate on said Y axis;
  and wherein further data coordinates are plugged into said second formula for determining horizontal triviality.

13. The storage medium of claim 11, wherein said algorithm includes a third formula, comprising:

$$(\Delta X1 + \Delta Y1 + \Delta X2 + \Delta Y2 + \ldots + \Delta X_{(n-1)} + \Delta Y_{(n-1)})/(2(n-1)) >= S;$$

wherein:
  Y represents data coordinate of each character of said proposed password on said y axis;
  n represents the number of characters comprising said proposed password;
  $\Delta X1$ represents an absolute value of a difference between a first and second data coordinate on said X axis;
  $\Delta Y1$ represents an absolute value of a difference between a first and second data coordinate on said Y axis; and
  S represents a variable parameter representing a mean distance between character keys of proposed passwords;
  and wherein further data coordinates are plugged into said third formula for determining diverse keystroke patterns of said proposed password.

14. The storage medium of claim 13, wherein successful completion of said algorithm causes a password verification mechanism to:
  transmit acceptance of said proposed password to at least one of:
    said user system;
    an administrator system; and
  update a password database to reflect said acceptance.

15. The storage medium of claim 11, wherein said identifier is linked to said user account, and wherein further, said keyboard profile is automatically provided over said network system via said link.

16. The storage medium of claim 11, wherein a list of available keyboard profiles are presented to said user selection, and wherein further, said user system selects an appropriate profile.

* * * * *